July 30, 1940.  C. W. WOOD  2,209,710
ROAD MATERIAL MIXING MACHINE
Filed July 19, 1939   3 Sheets-Sheet 2
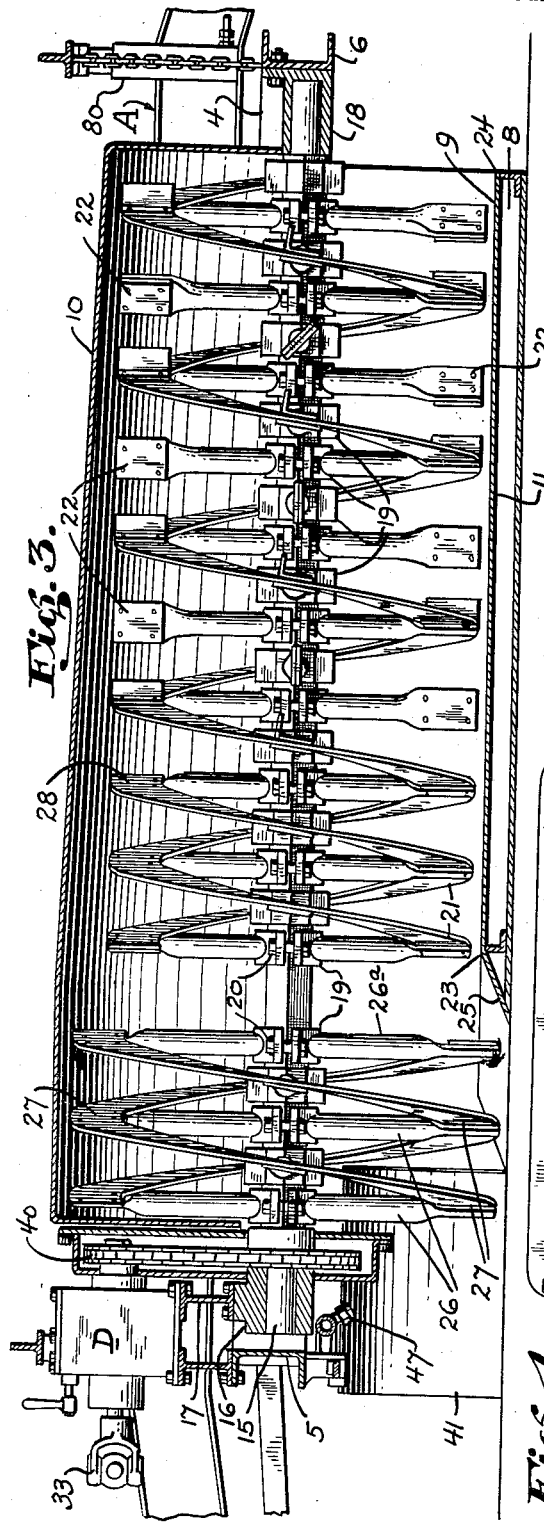
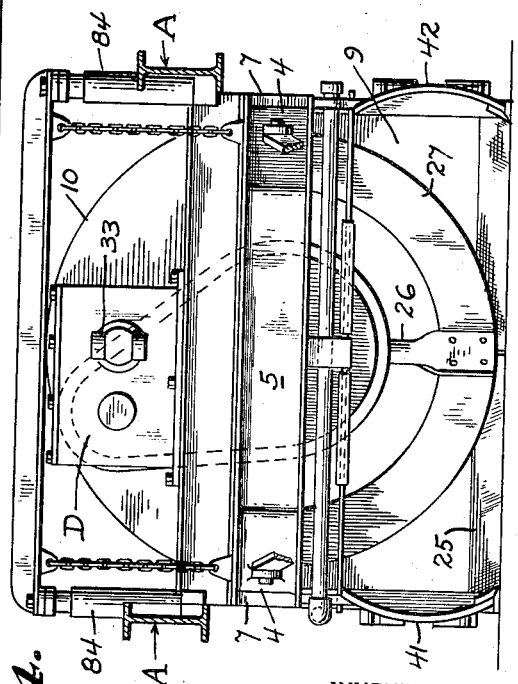
INVENTOR.
Clyde W. Wood
BY Chas. E. Townsend
ATTORNEY.

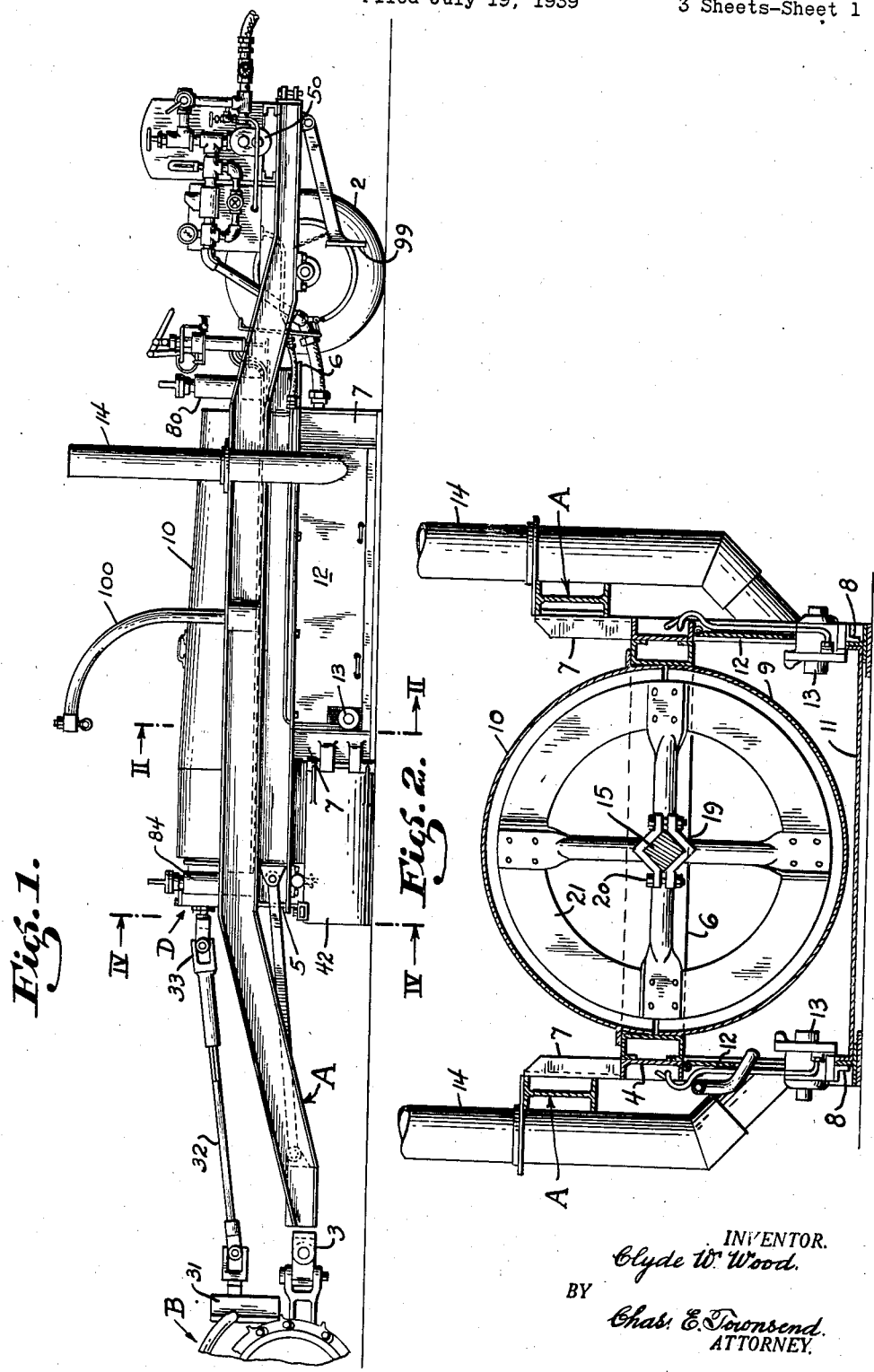

July 30, 1940.  C. W. WOOD  2,209,710
ROAD MATERIAL MIXING MACHINE
Filed July 19, 1939    3 Sheets-Sheet 3
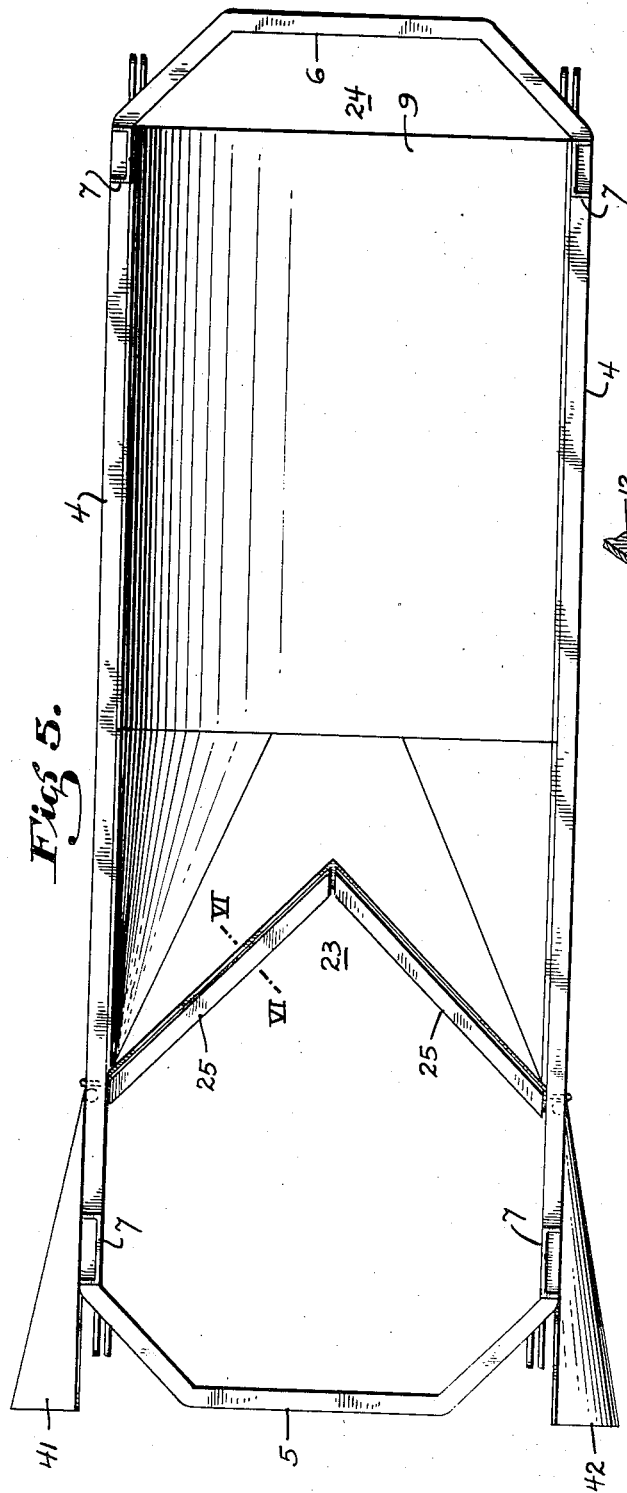
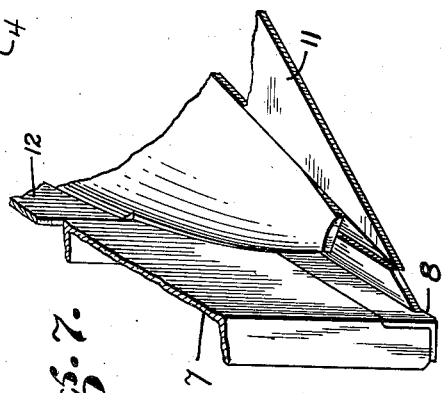
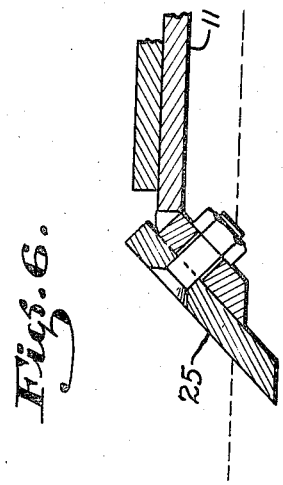
INVENTOR.
Clyde W. Wood.
BY Chas. E. Townsend.
ATTORNEY.

Patented July 30, 1940

2,209,710

UNITED STATES PATENT OFFICE 2,209,710

ROAD MATERIAL MIXING MACHINE

Clyde W. Wood, Los Angeles, Calif.

Application July 19, 1939, Serial No. 285,317

4 Claims. (Cl. 94—40)

This invention relates to a road material mixing machine, and more particularly, to improvements on the machine disclosed in Patent No. 1,997,959, entitled "Road material mixing machine," issued April 16, 1935.

Road material mixing machines of the type disclosed in the above mentioned patent have proved very efficient indeed, and as such have come into extensive use not only in many of the states of this country but also in foreign countries. The road surfacing material to be mixed and replaced varies to a considerable degree; for instance, in certain localities the material may be of a sandy character, while in other places broken rock, gravel and the like are encountered. In such instances little if any trouble is experienced, but where sticky materials are prevalent, such as clays, etc., the problem of gathering and introducing or conveying the material from the road surface into the mixing cylinder of the machine is considerable.

The object of the present invention is generally to improve and simplify the construction and operation of machines of the character described, and particularly to provide improved means whereby the road surfacing material is more readily gathered and conveyed from the road surface into the mixing cylinder of the machine. The improved structure is shown by way of illustration in the accompanying drawings, in which Fig. 1 is a side elevation of the machine;

Fig. 2 is a vertical cross section taken on line II—II of Fig. 1;

Fig. 3 is an enlarged central vertical longitudinal section of the mixing cylinder, said view also showing the front conveyor and the conveyor within the cylinder, and mixing arms whereby the material is mixed;

Fig. 4 is a vertical cross section taken on line IV—IV of Fig. 1;

Fig. 5 is a plan view of the vertically adjustable frame, said view showing the lower half of the mixing cylinder and the V-shaped scraper disposed in front thereof;

Fig. 6 is an enlarged cross section taken on line VI—VI of Fig. 5; and

Fig. 7 is a perspective view showing the fillet plates disposed between the scraper blade and the mixing cylinder.

Referring to the drawings in detail, and particularly to Figs. 1 and 4, A indicates the side bars of a main frame, supported at its rear end by a cross-axle and a pair of wheels 2, and at the forward end by a drawbar coupling 3 which is attached to a tractor B of any suitable type. Suspended between the side bars of the main frame is a vertically adjustable frame. This frame is best shown in Figs. 3, 4 and 5, and as noted, consists of a pair of horizontally disposed, longitudinally extending channel bars 4 connected at opposite ends by crossbars 5 and 6. Welded or otherwise secured to the bars 4 are pairs of vertically disposed bars 7, and secured to the lower ends of the bars 7 are a pair of horizontally disposed beams 8, there being one on each side of the frame.

The vertically adjustable frame forms a support for a mixing cylinder, a rotatable conveyor and mixer which extends therethrough, and a housing forming a furnace for the reception of one or more oil burners, whereby the mixing cylinder is heated; and it furthermore carries a pair of ground-engaging runners the function of which will hereinafter be described.

The mixing cylinder extends substantially from end to end of the vertically adjustable frame (see Figs. 1 and 3), and consists of two sections, a lower half section 9 which is permanently secured between the channel bars 4—4 of the vertically adjustable frame, and an upper half or cover section 10 which is removable to permit access to the cylinder for cleaning, repair, inspection, etc.

The furnace is disposed below the lower half section of the cylinder, and consists of a bottom plate 11 (see Figs. 2 and 3) which is welded or otherwise secured to the beams 8. This plate extends from the forward intake end of the cylinder to the rear end, and side plates 12—12 are also provided and extend the same distance. These plates, together with end plates and the bottom plate 11, form a chamber below the lower half of the cylinder, and a pair of oil burners such as indicated at 13 are positioned at opposite sides of the chamber and near the forward end. The flames from these burners are directed rearwardly along opposite sides of the mixing cylinder, and finally escape through a pair of stacks 14—14 which are disposed one on each side of the furnace chamber.

The material conveying and mixing mechanism is best illustrated in Figs. 2 and 3. It consists of a shaft 15 which extends from end to end of the mixing cylinder. This shaft is journaled at its forward end in a bearing 16 which is secured to the lower side of a cross-beam 17. The rear end of the shaft is journaled in a bearing 18, and this bearing is secured to the inner face of the cross-bar or beam 6. The shaft is driven from a power takeoff 31 on the tractor, through a shaft 32, which in turn drives a shaft through a coupling 33 which is journaled in a transmission gear box generally indicated at D. Shiftable gears are mounted in this box to permit varying speeds, the power being finally transmitted through a chain 40 which passes over a sprocket on the shaft 15 to drive the same. The shaft intermediate the bearings 16 and 18 is preferably square in cross section, and a plurality of tubular arms are secured to the shaft throughout its length, as shown. These arms are welded to V-shaped clamps generally indicated at 19, there being one arm to each clamp. These clamps and arms are placed in opposition to each other on the shaft, and are there secured by bolts or the like indicated at 20. The outer ends of the arms function as a support for a helically-shaped conveyor band 21, which is riveted, welded, or otherwise secured. The outer ends of the arms also form supports for a series of paddles or beater blades generally indicated at 22, which serve two functions: first, that of assisting the mixing of the material; and secondly, that of partially retarding or throwing back the material against the action of the helical feeder 21, so that a more thorough mixing action will be obtained.

By referring to Figs. 3 and 5 in particular, it will be noted that the lower half of the mixing cylinder extends from the point 23 to the rear or discharge end indicated at 24, and that the upper half or cover section extends a considerable distance forwardly of the forward end of the lower half of the cylinder. This is an important feature, as space is thereby provided for a feeding or conveying mechanism to assist in the delivery of the road material into the mixer.

When the machine is in operation, a scraper blade 25 which is secured to the forward end of the lower half of the mixing cylinder extends into the ground anywhere from four to six inches below the surface to be treated. When the machine is moving forward over the road, the material tends to build up to a considerable extent in front of the scraper blade, and as such would impose a considerable drag or load on the tractor hauling the machine. Such piling up of the material in front of the blade 25 is, however, avoided by the application to the shaft 15 of the arms indicated at 26. These arms carry a pair of helical conveyor bands 27, and as the material piles up in front of the scraper blade 25 it is engaged by the helical conveyor and thrown rearwardly into the front end of the lower half of the mixing cylinder. The forward end of the helical conveyor 21 is made double by the addition of the helical band 28. This assists in removing the material delivered by the scraper blade and the conveyor 27. In other words it tends to maintain the spaces immediately rearward of the scraper blade clear, and thereby forces the material rearwardly, where it is acted upon by the mixing paddles, and finally discharged at the rear end. In the machine disclosed in Patent No. 1,997,959 the scraper blade 25 is straight from end to end, and is positioned crosswise of the mixing cylinder, at the forward end thereof. In the present instance it will be noted by referring to Fig. 5 that the scraper blade is formed of two blades disposed on an angle with relation to each other, and when viewed from above presents a horizontally disposed V-shaped scraper blade which extends into the forward end of the mixing cylinder. This is of great importance, as the angle presented by the respective blades forming the V-shaped blade will, during forward movement of the machine, produce a shearing, cutting action with relation to the material encountered. The wide-open mouth presented by the scraper blades, together with their angular position, assists the material-gathering action, and as the blades extend from the forward end of the cylinder rearwardly and into the cylinder, the blades materially aid in introducing the material. Furthermore, the tendency of the material to pile up in front of the scraper blade is materially reduced.

The V-shaped blade is of further importance, as will hereinafter appear. By referring to Fig. 3, it will be noted that the arms 26 are longer than the arms within the cylinder, and as such is the case the conveyor or helical bands 27 are larger in diameter, and in actual practice have been increased in diameter to such an extent as to almost engage the road surface. Furthermore an additional set of arm 26a may be employed, and the helical conveyor is thereby lengthened so as to actually extend into the front end of the mixing cylinder, this being possible in the present instance as the V-shaped formation of the scraper blades provides a clearance space between them into which the helical conveyor extends.

The two blades forming the V-shaped scraper are welded or otherwise secured to the bottom plate 11 (see Fig. 6), the front end of this plate being obviously cut to form a V-shaped notch to receive the blades. In order to prevent material from piling up on the bottom plate on each side of the V-shaped scraper, fillets in the form of curved plates conforming to the contour of the mixing cylinder are welded on each side of the plate, and form a part of the cylinder. This is clearly shown in Figs. 5 and 7.

It may here be stated that the main improvements disclosed in this application are: first, the V-shaped scraper which extends from the forward end of the mixing cylinder and rearwardly into the cylinder; and secondly, a helical conveyor disposed in front of the cylinder and extending rearwardly between the two V-forming blades of the scraper into the cylinder to assist said blades in introducing the scraped and scooped up material into the same; and finally, a helical conveyor which is disposed in front of the cylinder and which may be of larger diameter than the helical conveyor and mixing arms disposed within the cylinder.

The remaining features of the machine shown are substantially identical to those described in my former patent already referred to, and will be briefly referred to in the description of operation. In actual operation the road material mixing machine is pulled ahead by the tractor B, as shown in Fig. 1, the vertically adjustable frame being lowered until the scraper blade 25 reaches substantially to the bottom of the loose material forming the road surface, this material having previously been loosened by road-breaking machines such as plows, scarifiers, etc., and reduced to proper consistency for mixing with oil, asphalt or like materials. Vertical adjustment of the frame is accomplished by suspending it from front and rear hydraulic jacks indicated at 80 and 84 which are arranged in pairs as shown in Figs. 1 and 4. These jacks are operated from a pressure pump and a valve-controlled mechanism in the usual manner, and further description thereof is thought unnecessary. As the machine advances, the loosened material is engaged by a pair of gathering blades indicated at 41 and 42. These blades direct the material toward the scraper blade, and this in turn also gathers and directs the material into the mixing cylinder. If there is any tendency for the material to pile up in front of the scraper blade, this will be taken care of by the helical conveyor 27, as previously described. The material is thus prevented from piling up in front of the machine, and is furthermore positively delivered into the forward end of the cylinder. After the material has entered the cylinder, positive movement of the material in a rearward direction is insured by the double arrangement of the helical conveyor indicated by the numerals 21 and 28, but once the material has started in a rearward direction, the single helix which extends to the rear end of the cylinder is all that is required.

The oil, asphalt or other binder employed is discharged or sprayed on top of the loosened material through nozzles such as indicated at 47, the oil being drawn from a tank wagon which trails behind the road material mixing machine, by a pump 50, and is delivered to the spray nozzle under pressure. The oil contained in the trailer tank is preferably maintained in a heated condition to insure thorough mixing with the material, but experience has shown that there is a tendency for the oily mass to chill and adhere to the wall of the mixing cylinder, particularly as the material approaches the rear or discharge end. It is for this reason that a furnace chamber has been arranged along each side and under the lower half of the cylinder. By properly regulating the quantity of fuel oil delivered to the burner 13, practically any temperature may be maintained, particularly toward the rear end, so that the oil, and consequently the mixed mass, will be retained in a readily flowing condition.

The multi-speed transmission indicated at D is a very desirable feature, as it permits operation of the mixer shaft 15 at a constant speed regardless of the tractor speed. The tractor is capable of traveling at either a high or low speed, approximately a quarter of a mile an hour being the lower speed and a half mile an hour the high speed. When traveling at the lower speed, the gathering blades 41 and 42 are set to gather material from a strip of maximum width. A substantially predetermined quantity of material will then pass through the mixing cylinder. The spray nozzles are regulated to deliver the proper mixture, etc. If the tractor speed is increased to a high speed, or a half mile an hour, the gathering blades 41 and 42 must be adjusted to gather a strip of approximately half the width formerly handled. The quantity of material passing through at high speed will, however, be the same. Under the high speed condition, the rotating speed of the mixer would tend to double, as the tractor speed has doubled, but by using a two-to-one reduction obtainable in a multi-speed transmission, the rotating speed of the mixer may be maintained constant at either of the tractor speeds. Hence the conditions in the mixer will be constant regardless of the tractor speed, as the quantity of material passing through will be substantially the same. The revolutions of the mixer will be maintained constant, and the quantity of oil delivered by the spray nozzle will be constant, thereby avoiding continual changes and adjustments during operation.

The material passing through the mixing cylinder is deposited at a uniform rate at the rear end of the machine, and may there be engaged by a shearing plate such as shown at 99, and it then may be rolled or otherwise compacted to form a finished road surface.

The cover forming the upper half of the mixing cylinder is quickly and readily removed at any time for inspection, cleaning and repair, by employing a stanchion such as indicated at 100 (see Fig. 1). By hooking the chain block to the stanchion and swinging it over the cover, connection may be made with a handle on the cover, and it may be elevated and then swung to one side.

The improved construction and shape of the scraper blade 25, and the increase in diameter of the helical conveyor 27 disposed in front thereof, are the main improved features in the machine. By their use, practically any road material may be handled, whether it be of a sandy nature, gravel, rock, clay or otherwise, and it is these features which are presented in the following claims.

Having thus described and illustrated my invention, what I claim and desire to obtain by Letters Patent is:

1. A road material mixing machine comprising the combination of a wheel supporting frame, an open-ended cylinder extending longitudinally of the frame, a V-shaped scraper secured in the front end of the cylinder and extending rearwardly into the same for scraping up material from the road surface and for directing it into the cylinder as the machine progresses over the roadway, and means within the cylinder for mixing the scooped-up material and for conveying it through and discharging it at the rear end of the cylinder.

2. A road material mixing machine comprising the combination of a wheel supporting frame, an open-ended cylinder extending longitudinally of the frame, a V-shaped scraper secured in the front end of the cylinder and extending rearwardly into the same for scraping up material from the road surface and for directing it into the cylinder as the machine progresses over the roadway, a power driven shaft extending through the cylinder and forward thereof, means on the shaft within the cylinder for receiving the scooped-up material and for conveying it through and discharging it at the rear end of the cylinder, and means on the forward end of the shaft for engaging the scooped-up material and conveying it into the cylinder.

3. A road material mixing machine comprising the combination of a wheel supporting frame, an open-ended cylinder extending longitudinally of the frame, a V-shaped scraper secured in the front end of the cylinder and extending rearwardly into the same for scraping up material from the road surface and for directing it into the cylinder as the machine progresses over the roadway, a helical conveyor and cooperating mixing arms within the cylinder, and a helical conveyor disposed in front of and extending into the cylinder to engage and convey the scooped-up material into the cylinder.

4. A road material mixing machine comprising the combination of a wheel supporting frame, an open-ended cylinder extending longitudinally of the frame, a V-shaped scraper secured in the front end of the cylinder and extending rearwardly into the same for scraping up material from the road surface and for directing it into the cylinder as the machine progresses over the roadway, a helical conveyor and cooperating mixing arms within the cylinder, and a helical conveyor disposed in front of and extending into the cylinder to engage and convey the scooped-up material into the cylinder, said last named helical conveyor being of larger diameter than the helical conveyor within the cylinder.

CLYDE W. WOOD.